Sept. 7, 1926.  A. J. AUSPITZER  1,599,356
METHOD OF MAKING CONNECTIONS IN CABLES AND THE LIKE
Filed July 9, 1923
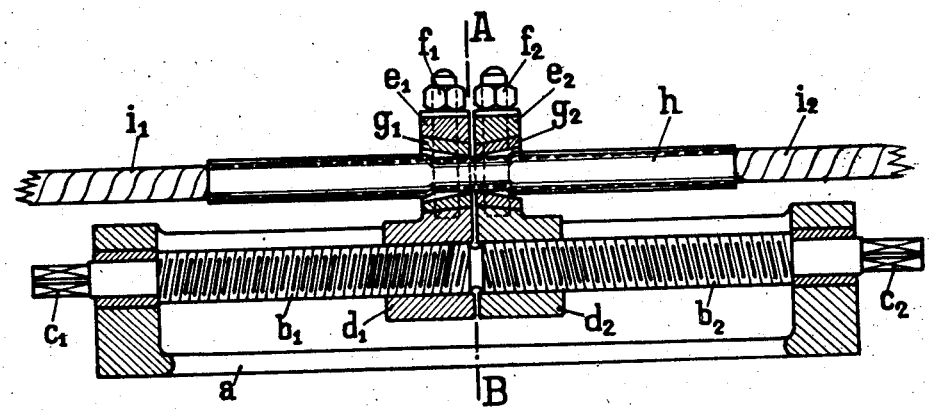
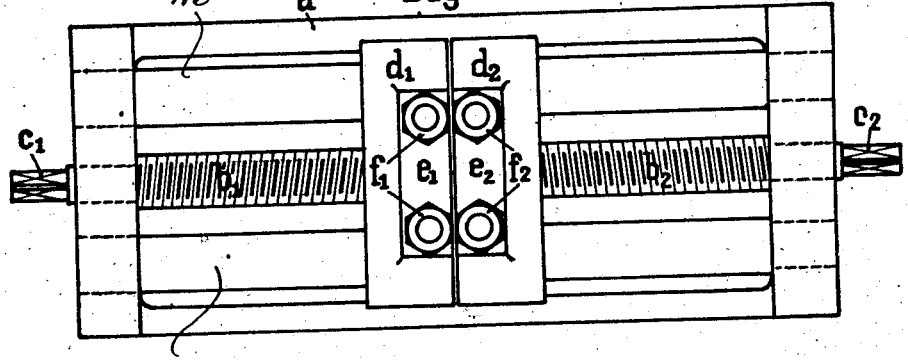
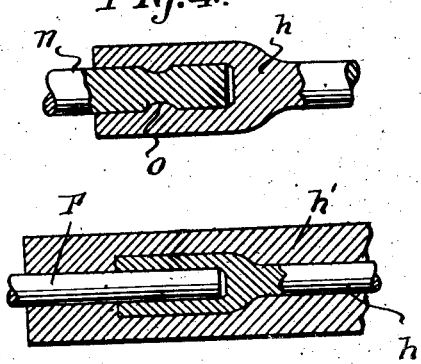
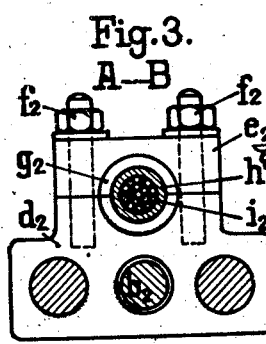
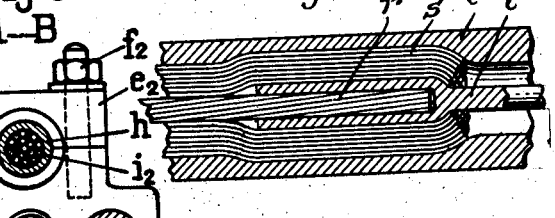
Inventor:
Alfred Joh. Auspitzer.

Patented Sept. 7, 1926.

1,599,356

UNITED STATES PATENT OFFICE.

ALFRED JOHANN AUSPITZER, OF FRANKFORT-ON-THE-MAIN, GERMANY, ASSIGNOR, BY MESNE ASSIGNMENTS, TO TRAHO METALLIC JOINT CORPORATION, OF NEW YORK, N. Y., A CORPORATION OF NEW YORK.

METHOD OF MAKING CONNECTIONS IN CABLES AND THE LIKE.

Application filed July 9, 1923, Serial No. 650,262, and in Germany August 12, 1922.

The present invention relates to a method of making connections between rods, tubes, wires, ropes and the like, hereinafter for convenience designated simply as "bodies such as cables."

The making of reliable connections between bodies such as cables has hitherto been effected by welding, soldering, splicing, screwing or in a similar manner. The disadvantage of welding and soldering lies in the necessity of heating which generally entails a reduction in the strength of the connected parts. The remaining types of connection do not allow of a completely intimate joining. This disadvantage easily leads to the destruction of the connection owing to oxidation or other corrosive phenomena. In many cases, such as for example arise in electrical engineering, attempts are made to counteract these destructive effects by subsequently coating the joints with lacquer, rubber, metal or the like or by smearing or pressing caulking agents thereon. These auxiliary measures however overcome the difficulty only in a very incomplete manner.

It also has been proposed to swage a sleeve into intimate contact with the ends of cables to be connected. Such a method of connection, however, either requires the application of very soft material or requires a tremendous amount of pressure. In the case of very soft metal, the connection cannot be very strong. In the case of a sleeve of relatively harder metal there is, aside from the necessary application of large forces, the danger of radial tears due to the excessive strains, which does not only materially impair the strength of the connection but also increases the danger of corrosion.

The present invention renders it possible to make connections which are not liable to any of the above mentioned disadvantages, by means of a simple method. This is effected by introducing the ends of the pieces to be connected into a metal tube, whereupon this tube is drawn by the reciprocating movement of suitable drawing apparatus. By this method it is possible, to render effective such extraordinary forces, that the materials are caused to flow and that the softer material of the tube thus unites so intimately with the harder material of the objects to be joined together that after the connection has been completed a new integral body is, so to speak, obtained. The drawing is preferably effected from the middle of the tubular casing towards the ends whereby the tube lengthens at its end, and inasmuch as the pieces to be connected remain stationary their ends cannot be separated from each other. If necessary the drawing appliances may be heated. In some cases it may be preferable to provide the ends of the pieces to be connected with threads, indentations, notches or the like, which are better adapted to be pressed into the tubular casing of softer metal. By these means a still more intimate connection can be obtained. The tubular casing can, of course, have any desired profile, it may be circular, elliptical and the like. If additional stability and resistance to external influences are to be imparted to the tubular casing it may be provided with a second casing of suitable material which may if desired, also be made in accordance with the present method.

The advance attained by the new method consists, apart from its simplicity, in that a more intimate and far firmer connection can be produced than was hitherto possible. Numerous experiments with aluminium ropes, copper ropes and steel ropes have proved that ropes connected together in accordance with the present method always break at places beyond the joints. Moreover the joints are not much thicker and not heavier than the rope itself.

In consequence of the characteristics of the connections produced according to the new method, air and moisture cannot penetrate between the drawn tubular casing and the ends of the pieces to be connected. An increase in corrosive phenomena, due to various chemical or physical processes, such as have often been observed in other kinds of joints are therefore excluded, especially as the tubular casing may, if desired, be made of the same metal or the same alloy as that of the pieces to be connected. Moreover permanent vibrations and repeated expansions and contractions due to fluctuations in temperature have no loosening effect upon the connection, whilst welds, soldered joints and screw connections cannot withstand such influences for any length of time.

The new method is intended to serve primarily for connecting wire ropes. The production of such connections which is of importance particularly in electrical engineering was hitherto circumstantial and difficult and in the hitherto known methods of connection frequent rapid deterioration of the connections could not be avoided in spite of the most careful workmanship. According to the new method connections are effected very quickly, almost without any trouble; they are absolutely permanent and entail little cost.

The present method is also applicable to other analogous purposes, for example for connecting single wires, tubes, rods and the like. The method is of course equally applicable whether the parts to be connected are similar or dissimilar.

By way of example the method will hereinafter be described with reference to the connection of copper ropes for an exposed conductor.

The two ends of the copper ropes to be joined together are introduced into a tube of less hardness, for instance of softer copper, so that said ends abut, or the two ends are spliced together, and the tube is thereupon pushed over the spliced ends, in which case one end of the rope must be inserted into the tube prior to splicing. Thereupon two draw-plates are drawn in opposite directions from the middle of the tube towards its ends, whereby the cross section of the tube is reduced in a known manner. During this operation the harder wires of the rope are pressed into the inner walls of the softer tubes and unite therewith so intimately that the connection produced is of at least the same strength as the rope itself. Since this connection is uniformly intimate and without holes over the entire length of the ends of the rope surrounded by the tube, moisture and air cannot penetrate the same and the connection is completely protected against oxidation or corrosion.

When connecting ropes having a core of different metal, for example aluminium ropes with a steel core, the method is preferably carried out by unraveling the outer aluminium rope and first connecting the ends of the steel core in accordance with the method of the present invention. The aluminium strands are thereupon replaced and joined together by the hereinbefore described method.

Instead of effecting the combination of the connecting tube with the pieces to be joined, by means of a draw-bench, other suitable mechanical methods such as for example rolling, in which a reduction of the cross section is accomplished by a simultaneous alteration in length may also be employed.

Inasmuch as the hereinbefore described method contemplates principally connections which have to be made outside the workshop, a drawing machine which is easily transportable and easily operable is necessary.

Such a drawing machine is shown by way of example in the accompanying drawings in which:

Fig. 1 is an elevation,

Fig. 2 a plan,

Fig. 3 a section along the line A—B of Fig. 1,

Fig. 4 is a view, partly in section of a portion of a connection in which the cable-like member is provided with transverse shoulders;

Fig. 5 is a similar view of a connection employing two superposed tubes, and

Fig. 6 is a similar view of a connection made to the end of a cable having a longitudinal core.

A right- and left-hand threaded spindle $b^1$, $b^2$, is mounted in a base $a$ and is adapted to be rotated by a crank lever inserted over the square head $c^1$, $c^2$.

On the spindle $b_1$ $b_2$ are mounted carriages $d_1$ and $d_2$ guided upon rods $m$ extending parallel to the spindle between the ends of the base $a$. The carriages $d_1$ and $d_2$ form the supports for female members $e_1$ and $e_2$ which preferably consist of two parts separable on a horizontal plane and receive the drawplates $g_1$ and $g_2$, respectively, which likewise consists of two parts separable in a longitudinal plane. The female members may be clamped upon each other by bolts $f_1$ and $f_2$.

When a connection is to be effected the female members are moved to the centre and a tube $h$ is inserted into the draw-plate after having previously slightly reduced the cross section of said tube by means of a hammer or the like. Thereupon the ends of the ropes $i^1$, $i^2$ are inserted into the tube $h$ and the draw-plates are moved outwardly in opposite directions by turning the spindle.

As shown in Fig. 4, the tubular casing $h$ is secured upon the end of a rod or bar $n$, which bar is indented at $o$ to provide a shoulder extending transversely of the rod. In the drawing operation the material of the tubular casing $h$ flows into the indentation to produce an exceedingly strong bond between the rod and casing.

As shown in Fig. 5, the connection may be made by drawing a tube $h$ upon the ends of bodies such as cables $p$, and subsequently drawing down a second tubular casing $h'$, which second casing preferably overlaps the ends of the first casing $h$.

In joining the ends of cables having a longitudinal core $r$ and outer strands or groups of strands $s$, the connection is preferably made as shown in Fig. 6. The outer strands $s$ are unravelled and turned back to permit the connection of the ends of the core $r$ by a tubular casing $t$, and the outer strands are then replaced and a second tubular casing t' is drawn over the adjacent ends of the cable.

What I claim is:

1. The method of attaching a tubular connecting element to the end of a body such as a cable, which comprises inserting the end of the cable within the tubular portion of the connecting element, and pulling the assembly through a constricted opening to apply a local pressure circumferentially of and progressively along said tubular portion to produce a concurrent reduction in cross-section and elongation thereof, whereby the materials of the tubular portion and said body are brought into intimate interengagement.

2. The invention as claimed in claim 1, wherein said deformation of said tubular portion into close engagement with said body is effected by subjecting the tubular portion to a drawing operation.

3. The method of connecting the ends of bodies such as cables by applying a tubular casing to the said ends, characterized by the fact that an intimate interengagement of the materials of said casing and said bodies is effected by pulling the assembly through a constricted opening to apply a local pressure circumferentially of and progressively along the casing to produce a concurrent reduction in cross-section and elongation thereof.

4. The method of connecting the ends of bodies such as cables by applying a tubular casing to the said ends, characterized by the fact that an intimate interengagement of the materials of said casing and said bodies is effected by subjecting the casing to a drawing action.

5. The method of connecting the ends of bodies such as cables which comprises forming the peripheral surfaces of the said ends to define shoulders in a longitudinal direction, placing a tubular casing over the said ends, and subjecting the said casing to mechanical action, causing a lengthening and a concurrent reduction in cross-section thereof to effect an intimate interengagement of the said casing and the said bodies.

6. The method of connecting the ends of bodies such as cables which comprises drawing a tubular casing over the ends to be connected and into intimate interengagement therewith, and drawing a second tubular casing over and into interengagement with said first casing.

7. The method of connecting the ends of cables having an inner core and outer strands, which comprises removing the outer strands to expose the ends of the cores, connecting the ends of the cores by drawing a tubular casing thereover and into intimate interengagement therewith, and drawing a second tubular casing over the outer strands and into intimate interengagement therewith.

8. The method of connecting the ends of cables having an inner core and outer strands, which comprises unravelling the ends of the outer strands to expose the ends of the cores, connecting the ends of the cores by drawing a tubular casing thereover and into intimate interengagement therewith, replacing the outer strands over the ends of the core and tubular casing, and drawing a second tubular casing over the said replaced ends of the outer strands and into intimate interengagement therewith.

9. The method of connecting the ends of bodies such as cables which comprises inserting the said ends into the opposite ends of a tubular casing, and drawing the metal of said casing in opposite directions from an intermediate portion thereof to effect an intimate interengagement between the material of said casing and of the said ends.

In testimony whereof I affix my signature.

ALFRED JOHANN AUSPITZER. [L. S.]